United States Patent

Wieland

[11] Patent Number: 6,158,934
[45] Date of Patent: Dec. 12, 2000

[54] KNOCK-IN PIN DOWEL

[75] Inventor: Achim Wieland, Leingarten, Germany

[73] Assignee: Adolf Wurth GmbH & Co. KG, Kuenzelau, Germany

[21] Appl. No.: 09/125,741

[22] PCT Filed: Feb. 22, 1997

[86] PCT No.: PCT/EP97/00858

§ 371 Date: Aug. 21, 1998

§ 102(e) Date: Aug. 21, 1998

[87] PCT Pub. No.: WO97/32142

PCT Pub. Date: Sep. 4, 1997

[30] Foreign Application Priority Data

Feb. 28, 1996 [DE] Germany .............. 196 07 446

[51] Int. Cl.[7] .................................................. F16B 13/06
[52] U.S. Cl. ........................................ 411/80.1; 411/80.5
[58] Field of Search .................... 411/80.1, 80.2, 411/80.5, 45, 57.1, 59

[56] References Cited

U.S. PATENT DOCUMENTS

| 3,199,398 | 8/1965 | Weisz | 411/80.1 |
| 3,516,324 | 6/1970 | Berner | 411/80.5 |
| 4,789,285 | 12/1988 | Fischer | 411/80.1 |

FOREIGN PATENT DOCUMENTS

| 365857 | 1/1963 | Switzerland | 411/80.1 |
| 1141913 | 2/1969 | United Kingdom | 411/80.5 |

*Primary Examiner*—Flemming Saether
*Attorney, Agent, or Firm*—Quarles & Brady LLP

[57] ABSTRACT

A knock-in pin dowel contains a dowel shell with a non-expandable shaft part located on the outside and an expandable part connecting thereto. The expandable part is subdivided into two axially following or overlapping expandable areas, which are in each case formed by longitudinal slits and expandable segments remaining between said longitudinal slits. The two ends of the longitudinal slits of the first expandable area are closed, whereas the longitudinal slits of the inner expandable area directed towards the inside of the drilled hole are open at the dowel end.

8 Claims, 2 Drawing Sheets

KNOCK-IN PIN DOWEL

BACKGROUND OF THE INVENTION

The invention relates to a knock-in pin dowel. Knock-in pin dowels are normally made from plastic and are prefabricated with an expandable element already inserted to some extent into the dowel shell. The fitting of an article to a substrate takes place very easily, because the dowel only has to be inserted through the object to be fixed and then, with the aid of a hammer, the fitter strikes the head of the expandable element. This blow serves both to completely introduce the dowel shell and to subsequently expand the dowel shell by the expandable element driven into it.

Normally the dowel shell contains an expandable part, which has two diametrically arranged longitudinal slits, so that two segments are formed, which can be folded outwards. The expandable element is generally a nail having a sawtooth-like thread, the latter not impeding the knocking in process (DE-OS 26 07 338, DE-OS 39 12 749).

This type of dowel is generally used when concrete constitutes the substrate and in which relatively good, cylindrical drilled holes can be produced.

However, there are increasing numbers of building materials, in which the material is more loosely seated, so that it is not possible to produce precise dowel holes, e.g. hollow chamber blocks or stones or lightweight building materials. Thus, the knock-in pin dowel is not adequately secured in such building materials.

The problem of the invention is to provide a knock-in pin dowel, which ensures a good anchoring, even in unfavourable wall building materials.

SUMMARY OF THE INVENTION

The invention relates to a knock-in pin dowel having two longitudinal slits located at different points on the dowel shell, wherein the expandable part of said shell is split up into two expandable areas, each of which can be expanded and can therefore engage on the dowel hole wall. Even if one expandable area cannot bring about an anchoring, because at said point there is a chamber of a hollow chamber block, the second expandable area can bring about anchoring. In irregularly shaped drilled holes, the two expandable areas can be expanded to a different degree. Thus, even if the building material is not particularly favorable, the dowel always leads to a good anchoring and in many cases also along a larger surface with a constant pressing force.

According to a further development of the invention, the at least one or also several longitudinal slits of the first expandable area is circumferentially displaced with respect to the at least one longitudinal slit of the second expandable area.

According to another further development of the invention, the longitudinal slits in the two expandable areas overlap in the longitudinal direction of the dowel shell. As a result the two expandable areas also overlap somewhat. In the other case, when the two expandable areas do not overlap, a central area can be formed, in which there is no expansion. In individual cases, this may also be desired. However, the overlapping of the expandable areas leads to the creation of an extended or lengthened expandable area, which in the case of good drilled holes leads to a clamping along a considerable length, whilst the advantages of two separate expandable areas are maintained in the case of poor material.

The invention provides at least two longitudinal slits in each expandable area. Admittedly, expansion occurs when there is only one longitudinal slit, but the expansion is more favorable with two slits.

As the expansion behaviour of the expandable area with the longitudinal slits closed on both sides is different than that of an expansion area at the end of the dowel, where the longitudinal slits continue through to the end and consequently, do not need to be closed, according to a further development of the invention, there are a different number of longitudinal slits in the two expandable areas.

It is also possible for the length of the two expandable areas to differ.

As the dowel shell is to be injection molded from plastic, for a simplified production of the dowel according to the invention, the outer face of the dowel shell can be inwardly differently flattened from the circular cross-section on either side of the longitudinal slit of the first expandable area. This makes it possible to produce the slits with the aid of the core forming the inner opening of the dowel shell, in that on said core are placed lateral ribs, whose radial outsides do not extend up to the external diameter of the shell and instead only up to the flattened areas. Thus, following the production of the dowel, said core can be drawn forwardly out of the mold.

According to a further development of the invention, the inner opening of the dowel shell has, starting from the dowel head, a first cylindrical area and following onto the latter a diameter-reducing area. This first cylindrical area serves to hold the expandable element, because the knock-in pin dowels of this type are sold and used in the prefabricated state. Thus, in said cylindrical area, the expandable element can be secured with a certain clamping action, so that it does not drop out of the dowel shell.

It is possible for the length of the cylindrical area of the inner opening to correspond roughly to the length of the non-expandable shaft part of the dowel shell.

According to a further development of the invention, between the cylindrical area and the diameter-reducing area of the inner opening, is formed a roughly right-angled inner shoulder.

On knocking in the dowel, the expandable element, which can have a conical tip, engages on said shoulder. The force acting as a result of the blow on the bead of the expandable element is initially intended to drive the dowel as far as possible into the hole. Only subsequently is the expandable element intended to expand the dowel shell. Through the provision of the inwardly directed shoulder, a possibility is created here of adjusting the resistance, which first has to be overcome, before the expandable element penetrates the dowel shell for expansion purposes.

The invention proposes that the expandable element be constituted by a threaded screw nail. The thread is conventionally a sawtooth thread with a flat, front shoulder and a steeper, rear shoulder. The flat shoulder is intended to make it possible to knock the nail into the dowel, without this movement being impeded by the thread. The steeper shoulder is intended to prevent the drawing out of the nail. The thread is necessary for extracting the knock-in pin dowel, but not for putting the dowel into place. A circumferential rib could also be used to prevent the drawing out of the dowel.

According to the invention, at its tip, the screw nail shaft has a first, thread-free portion. For the function of the dowel when putting into place, it is necessary for the expanding movement of the dowel to only arise when the said dowel is in place. To have minimum tolerances when putting the dowel into place, according to the invention the thread-free portion of the screw nail is matched to the internal diameter of the cylindrical part of the inner opening on the cross-sectional narrowing through the ring shoulder. A thread-free portion can be matched much more accurately to a specific diameter than the thread subsequently rolled onto the shaft. Therefore the thread-free portion leads to a more precise matching of the dowel.

Further features, details and advantages can be gathered from the claims, whose wording is made by reference into the content of the description, the following description of a preferred embodiment of the invention and the attached drawings, wherein show:

DESCRIPTION OF THE PREFERRED EMBODIMENT

Figure 1:
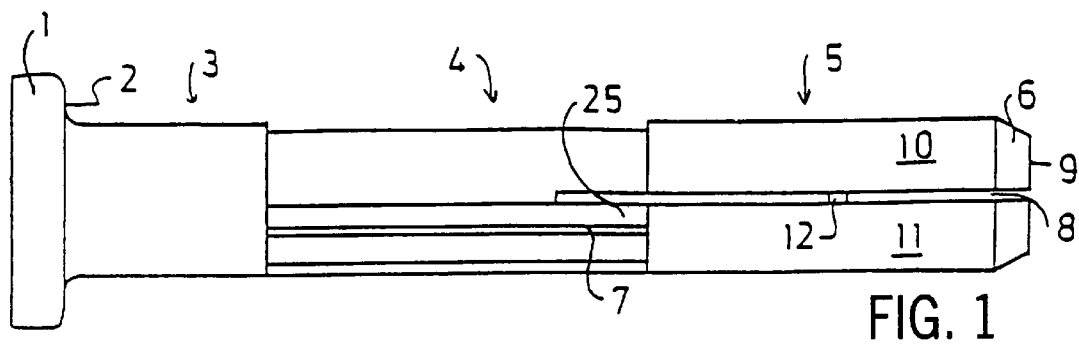
FIG. 1 A side view of a dowel according to the invention.

FIGS. 1 to 4 show side views or longitudinal sections through the shell of the dowel according to the invention. The dowel shell contains at its end, which is the outer end on fitting in a dowel hole, a dowel head 1. In the represented embodiment, the dowel head 1 has a larger circumference compared with the remainder of the dowel shell, so that on its underside 2 is formed a contact surface for engagement on the object to be fixed. This contact surface 2 simultaneously limits the knocking in movement of the dowel shell.

To the dowel head 1 is connected a shaft part 3, in which the dowel shell in the case of a constant wall thickness forms a non-expandable area. The aim is to dimension the axial length of the shaft part 3 in such a way that it corresponds to the thickness of the object to be fixed or is somewhat larger, because a wedging is to take place with the wall to which the object is fixed.

To the non-expandable shaft part 3 is then connected a first expandable area 4 and the latter is followed by a second expandable area 5. Considered in the longitudinal direction of the dowel, both expandable areas are roughly of the same length. The inner end of the dowel shell, to the right in FIG. 1, has a bevel 6 facilitating the insertion of the dowel shell.

Whereas in the shaft part 3 the dowel shell has no longitudinal slits and is consequently not expandable, in the first expandable area it is provided, in circumferentially distributed manner, with three longitudinal slits 7, whereof only one slit 7 is visible in the side view of FIG. 1. The longitudinal slits 7 of the first expandable area 4 start at the end of the non-expandable shaft part 3 and end roughly in the center of the expandable part of the dowel shell assembled from the two expandable areas 4 and 5. As in the represented embodiment the three longitudinal slits 7 of the first expandable area 4 are uniformly circumferentially distributed, the second longitudinal slit is behind the drawing plane and the third at the top.

In the second expandable area 5, the dowel shell contains two longitudinal slits 8, which are diametrically arranged with respect to the diameter, so that the second longitudinal slit 8 is located precisely behind the first, visible slit. The longitudinal slits 8 of the second expandable area start roughly in the centre of the expandable part of the dowel shell and extend to the inner end 9 of said shell, where said slits 8 are open.

The two expandable segments 10,11 of the second expandable area separated by the two longitudinal slits 8 are interconnected by in each case two webs 12, which on putting the dowel into place and on expanding the same tear apart.

As can be gathered from FIG. 1, the longitudinal slit 8 of the second expandable area 5 starts before the end of the first longitudinal slit 7 of the first expandable area 4, so that, considered in the axial direction, there is an overlap of the longitudinal slits 7, 8.

Figure 2:
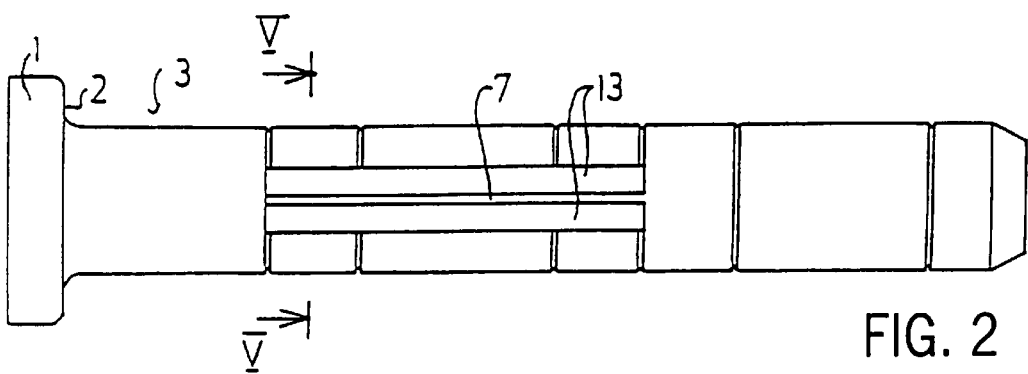
FIG. 2 A side view of the dowel from a direction turned by 90°.

FIG. 2 is a plan view of the dowel shell of FIG. 1 from the top therein, so that the third longitudinal slit 7 of the first expandable area 4 mentioned therein can be seen.

On either side of the longitudinal slit 7, the outer contour of the dowel shell is inwardly flattened, so that there is a flattened surface 13 on either side of the longitudinal slit 7. As a result of said flattening, in the side view of FIG. 1 the diameter of the first expandable area 4 appears to be smaller.

Figure 3:
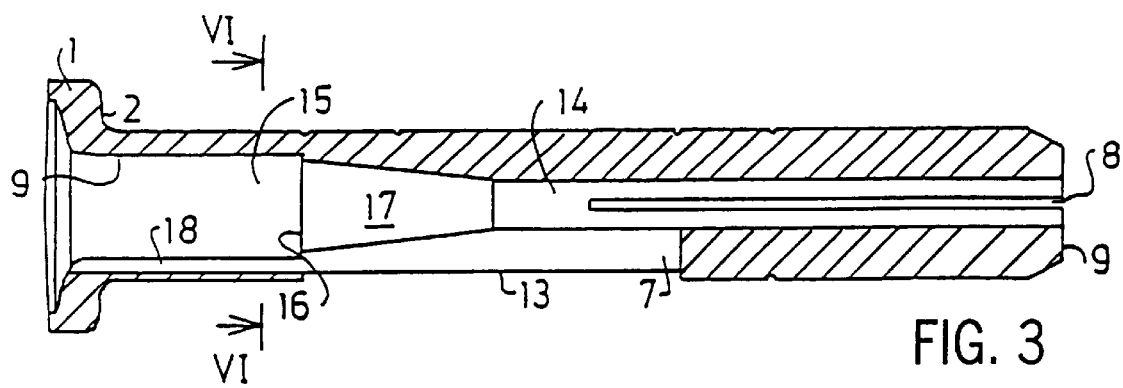
FIG. 3 A longitudinal section through the dowel shell.

FIG. 3 is a longitudinal section through the dowel shell according to the invention. The inner opening 14 passing through the entire dowel shell is intended to receive the expandable element and in conjunction therewith serves to expand the dowel shell. At the outer end of the dowel shell the inner opening 14 contains a first cylindrical portion 15. The length of this cylindrical portion 15 and its arrangement correspond substantially precisely to that of the non-expandable shaft part 3. At the inner end of the cylindrical portion 15 is provided a jump-like diameter reduction, which forms a step 16 running roughly at right angles. Starting from said step, the internal diameter of the inner opening tapers and in this way forms a tapering portion provided with a wedge surface 17. The length of this tapering portion forming the wedge surface 17 is roughly half as long as the length of the longitudinal slit 7 of the first expandable area 4.

FIG. 3 also shows the overlap of the two types of longitudinal slits 7, 8 in the longitudinal direction. It can also be seen that the two types of longitudinal slits 7 and 8, considered circumferentially, are mutually displaced.

At the bottom of FIG. 3 it can be seen that the outer edges of the flattened surfaces 13 on either side of the slit have a smaller distance from the median longitudinal axis of the dowel shell than the external diameter of the shaft part 3. Thus, in the direction of the outer end of the dowel shell, the longitudinal slit 7 of the first expandable area 4 is continued by a slot 18 in the inner wall 19 of the cylindrical portion 15 of the dowel shell. This slot 18 issues at the outer end face of the dowel shell.

As a result of the setting back of the flattened surfaces 13 with respect to the actual cylindrical outer circumference of the dowel shell, it is possible for the longitudinal slits 7 to be produced by a core having external ribs and which following the production of the dowel in an injection mould can be drawn out forwards. The longitudinal slits 7 have in fact a limited length. As a result the plastic sleeve can be manufactured in a relatively simply constructed mould, because the mould can be constructed in two parts with a core insertable from the front. This core leads to the inner end 9 of the dowel shell.

Figure 4:
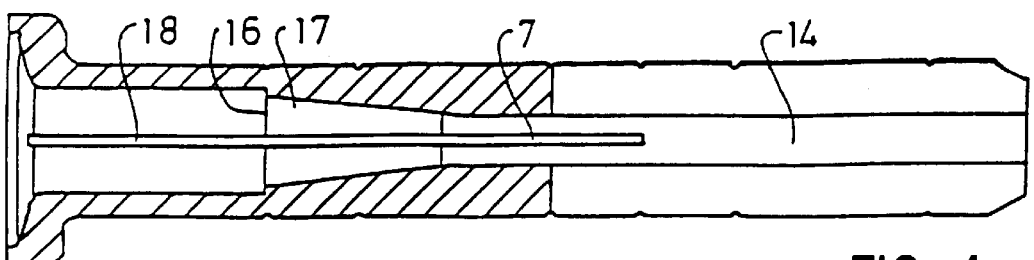
FIG. 4 A longitudinal section through the dowel shell displaced by 90° compared with FIG. 3.

FIG. 4 shows a longitudinal section through the dowel shell in a different median longitudinal plane. Here the section is such that it is located in the longitudinal slits 8 of the rear expandable area 5. Here again it can be seen that the longitudinal slit 7 of the first expandable area overlaps with the longitudinal slit 8 of the inner expandable area.

Figure 5:
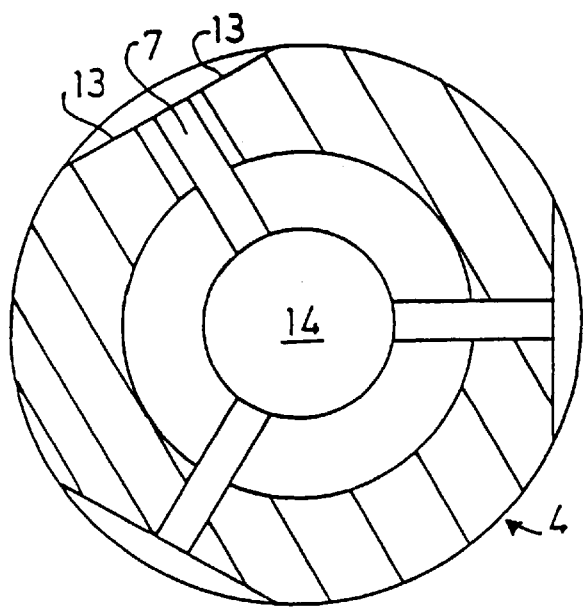
FIG. 5 A first cross-section through the dowel shell along line V—V.

FIG. 5 shows on a larger scale a section along line V—V in FIG. 2. Thus, the section is placed through the first expandable area 4. It can be clearly seen that the three uniformly circumferentially distributed longitudinal slits 7 of the first expandable area only extend up to a point formed by the flattened surface 13 and which has a smaller distance from the median longitudinal axis than the unflattened parts of the dowel shell. This permits the aforementioned production with a core having ribs, because the outsides of the ribs extend up to the flattened surface 13, but are located within the wall of the shaft part.

Figure 6:
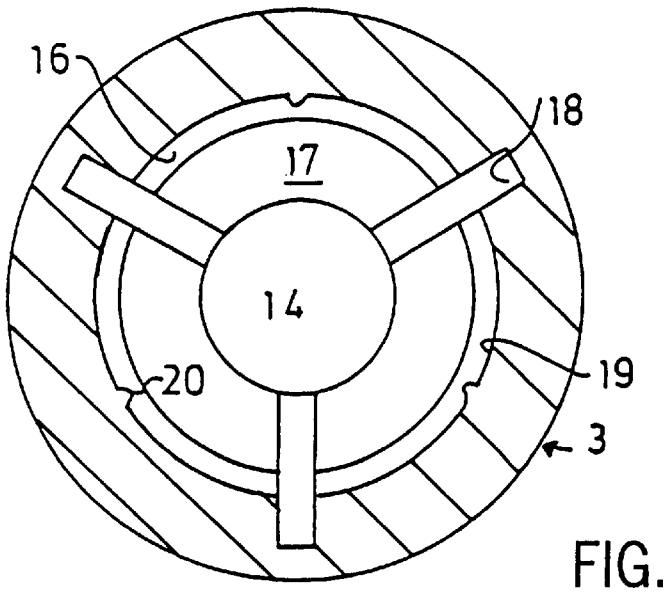
FIG. 6 A second cross-section through the dowel shell along line VI—VI.

FIG. 6 shows on the same scale as in FIG. 5 a section through the dowel shell, namely at a point through the shaft part 3. Here, said outer ribs of the core form the visible slots 18, which are formed in the inner wall 19 of the cylindrical recess 15 in the shaft part 3 of the dowel shell.

To the wall 19 is then connected the shoulder surface 16 mentioned in conjunction with FIG. 3, to which is in turn connected the conical surface 17.

Centrally between the slots 18 are formed small, roughly triangular projecting ribs 20, which serve to secure and guide the expandable element, are formed in the cylindrical recess 15 of the dowel shell.

Figure 7:
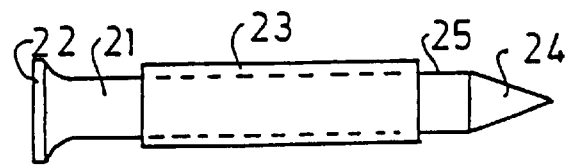
FIG. 7 The front end of an expandable element intended for the dowel shell of the preceding drawings.

The front end of such an expandable element is shown in simplified form in FIG. 7. It is a threaded nail, a fastening element, which is constructed as a nail with a cylindrical shaft 21 and a nail head 22, which has over most of the length of the shaft 21 a rolled-on thread 23. Said thread has a sawtooth profile, such as is shown in the aforementioned DE-OS 39 12 749.

The inner end of the screw nail has a conical tip 24. Directly connected to the tip 24 is a thread-free, cylindrical, smooth portion 25, whose diameter is matched to the diameter of the cylindrical recess 15. In the case of threaded nails, the diameter of the shaft and therefore also the diameter of the front, thread-free portion 25 can be made much more accurately than the thread diameter. Larger tolerances can occur in connection with the thread diameter.

The knock-in pin dowel according to the invention is used as follows. Following the manufacture of the dowel shell and the threaded nail, the latter is inserted in the cylindrical recess 15, where it is secured by the ribs 20. It is inserted to such an extent that its conical portion 24 engages on the edge between the step 16 and the conical surface 17. The conical portion 24 of the threaded nail is more blunt than the conical surface 17 in the dowel shell.

The dowel is in this way introduced through an opening of an object to be fixed to a wall and is inserted in the drilled hole. This insertion can take place manually. It need only take place to such an extent that the dowel shell acquires a certain guidance. Subsequently the fitter strikes with the hammer the threaded nail head 22. This initially produces a force in the longitudinal direction of the dowel shell, which engages on the shoulder 16 and introduces the dowel shell until the underside 2 of the head engages on the object to be fixed. A further driving in of the threaded nail can no longer lead to a displacement of the dowel shell, so that the driving in force of the hammer is now used for driving the threaded nail into the dowel shell, so that by action on the conical surface there is now an expansion firstly of the first expandable area 4 and then the second expandable area 5. Initially the longitudinal slits 7 of the first expandable area 4 are expanded, followed by the widening of the longitudinal slits 8 of the second expandable area 5. The area 25, cf. FIG. 1, formed between the end of the first longitudinal slit 17 and the start of the second longitudinal slit 8, then forms a tilting web. On expanding the longitudinal slits 8, the webs 12 are torn off. The expansion of the expandable part comprising the two expandable areas d and 5 takes place with a more uniform expanding force, which is more uniformly distributed over the length, so that the dowel holds even in looser building material or material with breaking away portions.

I claim:

1. A knock-in pin dowel, having an expandable element more particularly constructed as a threaded nail, and a dowel shell, which has a dowel head forming an outer end of the dowel shell, a shaft part connected to the dowel head and a first expandable part connected to the shaft part, the first expandable part having at least one longitudinal slit starting from the shaft part and ending upstream of the dowel end, for allowing expansion of the first expandable part, and a second expandable part having at least one longitudinal slit starting approximately from a central area of the first expandable part and extending up to the dowel end, wherein said dowel has an operating position in which the first expandable part and the second expandable part are expanded in a radial direction, wherein a number of longitudinal slits in the first expandable part differs from the number of the longitudinal slits in the second expandable part, and wherein the longitudinal slits in the first expandable part and the longitudinal slits in the second expandable part are each equally spaced in a circumferential direction of the dowel shell.

2. The knock-in pin dowel according to claim 1, wherein the longitudinal slits in the first expandable part and the longitudinal slits in the second expandable part overlap each other in the longitudinal direction of the dowel shell.

3. The knock-in pin dowel according to claim 1, wherein the outer face of the dowel shell on either side of the longitudinal slit of the first expandable part is flattened in inwardly diverging manner from the shape of the cross-section.

4. The knock-in pin dowel according to claim 1, wherein the dowel shell has an inner opening starting from the dowel head, wherein the inner opening has a first cylindrical area and following onto the first cylindrical area has a diameter-reducing area.

5. The knock-in pin dowel according to claim 4, wherein the length of the cylindrical area of the inner opening corresponds approximately to the length of the shaft part of the dowel shell.

6. The knock-in pin dowel according to claim 4, wherein between the cylindrical area and the tapering area of the inner opening of the dowel shell, is formed an inner shoulder running approximately at right angles.

7. The knock-in pin dowel according to claim 1, wherein the expandable element is a screw nail provided with a thread (23) and whose shaft (21) has at its tip a first thread-free portion (25).

8. The knock-in pin dowel according to claim 7, wherein the thread-free portion (25) has its diameter adapted to the cylindrical portion (15) of the inner opening (14) of the dowel shell.

* * * * *